(12) United States Patent
Baksi et al.

(10) Patent No.: US 11,323,332 B2
(45) Date of Patent: May 3, 2022

(54) INTELLIGENT SOCIAL IOT WORK PLAN

(71) Applicant: International Business Machines Corporation, Armonk, NY (US)

(72) Inventors: Salmali Baksi, Kolkata (IN); Baishali Ghosal, Kolkata (IN); Radha Mohan De, Howrah (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/583,468

(22) Filed: Sep. 26, 2019

(65) Prior Publication Data

US 2021/0099356 A1 Apr. 1, 2021

(51) Int. Cl.
| | |
|---|---|
| *G06F 15/16* | (2006.01) |
| *H04L 41/14* | (2022.01) |
| *H04L 67/12* | (2022.01) |
| *G06F 9/451* | (2018.01) |

(52) U.S. Cl.
CPC .............. *H04L 41/14* (2013.01); *G06F 9/451* (2018.02); *H04L 67/12* (2013.01)

(58) Field of Classification Search
CPC ....................................................... H04L 41/14
See application file for complete search history.

(56) References Cited

U.S. PATENT DOCUMENTS

| | | | |
|---|---|---|---|
| 10,262,019 B1 | 4/2019 | Reiner | |
| 2016/0249319 A1* | 8/2016 | Dotan-Cohen | ... H04M 3/42365 |
| 2016/0363944 A1* | 12/2016 | Kim | ....................... G05B 11/14 |
| 2018/0020057 A1 | 1/2018 | Koo | |
| 2018/0152506 A1* | 5/2018 | Simo | ..................... G06Q 10/101 |
| 2018/0285827 A1* | 10/2018 | Dotan-Cohen | .... G06Q 10/1095 |
| 2019/0114200 A1 | 4/2019 | Lee | |

* cited by examiner

*Primary Examiner* — Jeffrey R Swearingen
(74) *Attorney, Agent, or Firm* — Jordan A. Lewis; Randy E. Tejeda (57) ABSTRACT

Embodiments of the present invention provide a computer system, a computer program product, and a method that comprises generating a first user workplan based on received input; automatically modifying the first user workplan based on subsequent received input, wherein automatically modifying the first user workplan comprises comparing the first user workplan to a performance baseline workplan for a user computing device, measuring a deviation between the performance baseline workplan and the first user workplan; and generating a second user workplan based on any modifications made.

20 Claims, 5 Drawing Sheets

INTELLIGENT SOCIAL IOT WORK PLAN

FIELD OF THE INVENTION

The present invention relates generally to the field of social IoTs, and more specifically to intelligent social IoTs within the field of IoTs.

BACKGROUND

Generally, the Internet of Things ("IoT") is a system of interrelated computing devices that are provided with unique identifiers and the ability to transfer data over a network without requiring human-to-human or human-to-computer interaction. IoT technology is most synonymous with products pertaining to the concept of the "smart home", covering devices and appliances (e.g. lighting fixtures, thermostats, home security systems, and other home appliances) that support one or more common ecosystems, and can be controlled via devices associated with that ecosystem, such as smart phones and smart speakers.

A smart home is a defined as a residence that uses internet-connected devices to enable the remote monitoring and management of appliances and systems, such as lighting and heating. When a smart home is used as a part of the IoT, smart home systems and devices often operate together, sharing consumer usage data among themselves.

The Social Internet of Things ("SIoT") is defined a social network of IoT enabled devices. The SIoT technology can be shaped as required to guarantee the network navigability, so that the discovery of objectives and services is performed effectively, and the scalability is guaranteed like in human social networks. Additionally, the SIoT can develop a level of trustworthiness that can may be established in leveraging the degree of interaction among things that are connected.

SUMMARY

Embodiments of the present invention provide a computer system, a computer program product, and a method that comprises generating a first user workplan based on received input; automatically modifying the first user workplan based on subsequent received input, wherein automatically modifying the first user workplan comprises comparing the first user workplan to a performance baseline workplan for a user computing device, measuring a deviation between the performance baseline workplan and the first user workplan; and generating a second user workplan based on any modifications made.

DETAILED DESCRIPTION

Embodiments of the present invention recognize the need for ways to provide an intelligent SIoT to be used within the social network of IoT of enabled devices that may encompass smart home devices and has the ability to automatically gather, generate, and manipulate work plans, schedules, and baseline performance for a user or a family unit in an environment comprised of computing devices. Embodiments of the present invention provide systems, methods, and computer program products for an improvement to intelligent SIoT technology that can optimize one's work plan within an authenticated environment, validated and consented by users. In this embodiment, program dynamically generates and optimizes displays for the generated user work plan based on information collected from one or more IoT user devices. Currently, common SIoT technology known in the art lacks the ability to automatically optimize multiple work plans using multiple devices for multiple users of the SIoT network. For example, a user computing device inputs data with a SIoT about specific performance of an appliance, then the SIoT technology will relay that input so that it is displayed on multiple devices throughout the users home and smart phone, and if any other usage or inputs conflict with that performance, then the SIoT technology will automatically shift the conflicting usage to adapt to the baseline performance, update the display, alert the user, and calculate the efficiency saved by the modification.

Figure 1:
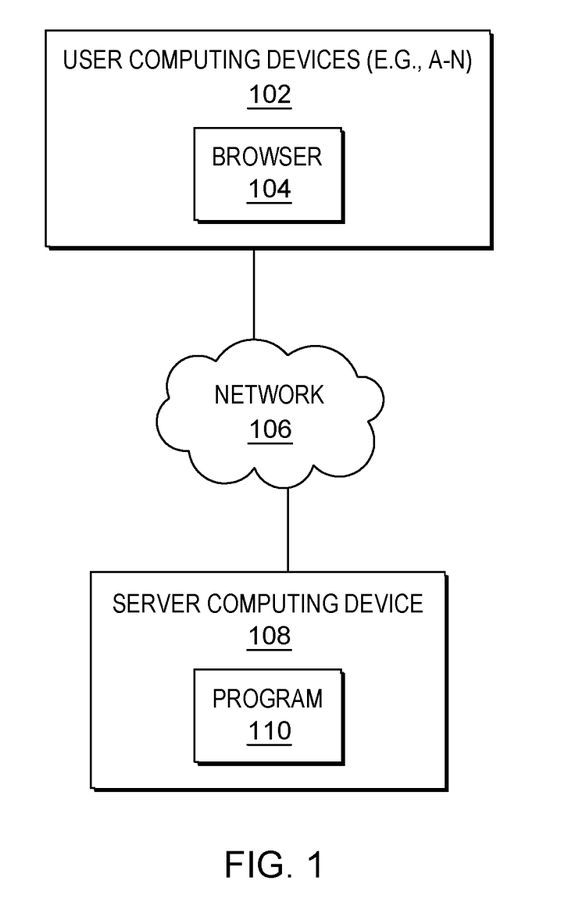
FIG. 1 is a functional block diagram depicting an environment with a computing device connected to or in communication with another computing device in accordance with at least one embodiment of the present invention.

FIG. 1 is a functional block diagram of computing environment 100 in accordance with an embodiment of the present invention. Computing environment 100 includes user computing devices (e.g. a-n) 102 and server computing device 108 connected via network 106. User computing devices 102 may be home appliances or smart devices that are capable of communicating input to server computing device 108. For example, user computing devices 102 will include smart phones, smart speakers, light bulbs, security devices, home alarms, central air conditioning units, washers, dryers, refrigerators, and any other home appliances capable of transmitting or communicating input to server computing device 108. Server computing device 108 may be a desktop computer, laptop computer, specialized computer server, or any other computing device known in the art. In certain embodiments, server computing device 108 may represent computer systems utilizing multiple computers or components to act as a single pool of seamless resources when accessed through network 106. Generally, user computing devices 102 and server computing device 108 may be representative of any electronic device, or a combination of electronic devices, capable of executing machine-readable program instructions, as described in greater detail with regard to FIG. 4.

User computing devices 102 may include browser 104 and an instance of program 110 (not shown). In this embodiment, browser 104 may be a downloadable application on a smart device or home appliance that has an interactive user interface that displays a user specific workplan. This user specific workplan is formed through input collected from the user's SIoT and input received by user computing devices 102. The user's SIoT may include the collection of user computing devices 102 that are in communication with any social network accounts. In another embodiment, the user's SIoT may also be defined as a community of user computing devices 102 that are capable of communicating with other users' devices. The input received by user computing devices 102 may consist of preferred user home temperature, user's average departure and arrival time to and from work, user's average electricity usage, and other input that the user's smart devices and home appliances collect. Browser 104 may display's the user's workplan, which is an overlay of input collected by the user's SIoT with the input received by user computing devices 102 in a linear presentation. For example, the user specific workplan will be a list or schedule of events for the day, week, or month displayed in browser 104 on user computing devices 102. In another embodiment, browser 104 may display an entire user's family workplans. In another embodiment, browser 104 may display the user's workplan in a spherical presentation. In another embodiment, browser 104 may display other user's workplans in comparison to the user's workplan.

Browser 104 may be implemented using a downloadable application, a web portal, or any other program that transmits input received by the user's SIoT and input received by user computing devices 102 to, and receives results and displays from, server computing device 108. In this embodiment, browser 104 displays a user workplan or another user interface on user computing devices 102. For example, browser 104 will display the user's air condition usage, television usage, electricity usage, information sent and received via a social network, and automobile gas usage in a liner presentation on user computing devices 102. In another embodiment, browser 104 may allow for the user to interact with the display to adjust the display of the list or schedule events as the user desires.

Network 106 can be a local area network ("LAN"), a wide area network ("WAN") such as the Internet, or a combination of the two; and it may include wired, wireless or fiber optic connections. Generally, network 106 can be any combination of connections and protocols that will support communication between user computing devices 102 and server computing device 108.

Server computing device 108 includes program 110 that receives the input collected from the user's SIoT and user computing devices 102. In other embodiments, program 110 can be stored locally on respective user computing devices 102. For example, where user computing devices 102 comprises a smart refrigerator and a smart glass, program 110 can be integrated either in the smart refrigerator and/or the smart glass.

In general, program 110 dynamically generates and optimizes displays for the generated user work plan based on information collected from one or more IoT user devices. In at least one embodiment, program 110 receives input from user computing devices 102 via network 106, generates a workplan from received input, integrates information from SIoT and user computing devices 102, modifies workplan to accommodate input received from SIoT and user computing devices 102, automatically controls user computing devices 102 in relation to user's work plan or automatically reschedules events upon accommodation of user's workplan from input received from SIoT and user computing devices 102, and transmits an accommodated workplan to browser 104 on user computing devices 102 as an interactive display in a linear presentation for the user. Input received by program 110 is defined as any information generated or otherwise pertinent to the user, and this information can include user generated events (e.g., user scheduled appointments) and predicted or suggested events (e.g., social media collected information). In this embodiment, when input is received from user computing devices 102, the input is received with the consent of the user via an opt-in/opt-out mechanism. Embodiments of the present invention can further transmit a notification to the user when data is collected or otherwise accessed. For example, program 110 will receive input from user computing devices 102 in the form of the user's normal time for departure and arrival from work, coupled with the average temperature the user sets the air conditioning unit upon arrival from work, coupled with the light bulbs that are operated upon the user's arrival from work, and generates the user's workplan based on that received input; then program 110 integrates input from the user's social media accounts in the form of the user's acceptance to a happy-hour invitation via the user's SIoT, which forces program 110 to automatically modify the user's workplan and automatically controls user computing devices 102 with input received from user's SIoT. In another embodiment, program 110 may compare user computing devices 102 performance to a manufacture's baseline usage of those appliances. In another embodiment, program 110 may compare user's workplan to another user's workplan regarding performance of user computing devices 102. Program 110 will then generate a modified workplan and transmit the modified workplan to browser 104 for display. In another embodiment, program 110 may generate an interactive display that allows the user to control user computing devices remotely. In another embodiment, program 110 may generate an interactive display that allows the user to optimize the workplan, which would automatically reschedule events and control user computing devices 102 as efficiently as possible. In another embodiment, program 110 may generate a notification to display on user computing devices 102 to alert a change in the user's workplan. In another embodiment, program 110 baselines the performance of a user workplan by adjusting the under-performing IoT devices, which would compare the performances of user computing devices 102 and finds an optimal configuration of usage of user computing devices 102 to generate a user workplan. In another embodiment, program 110 may sync suggested configurations to produce an efficient workplan for user computing devices 102.

Figure 2:
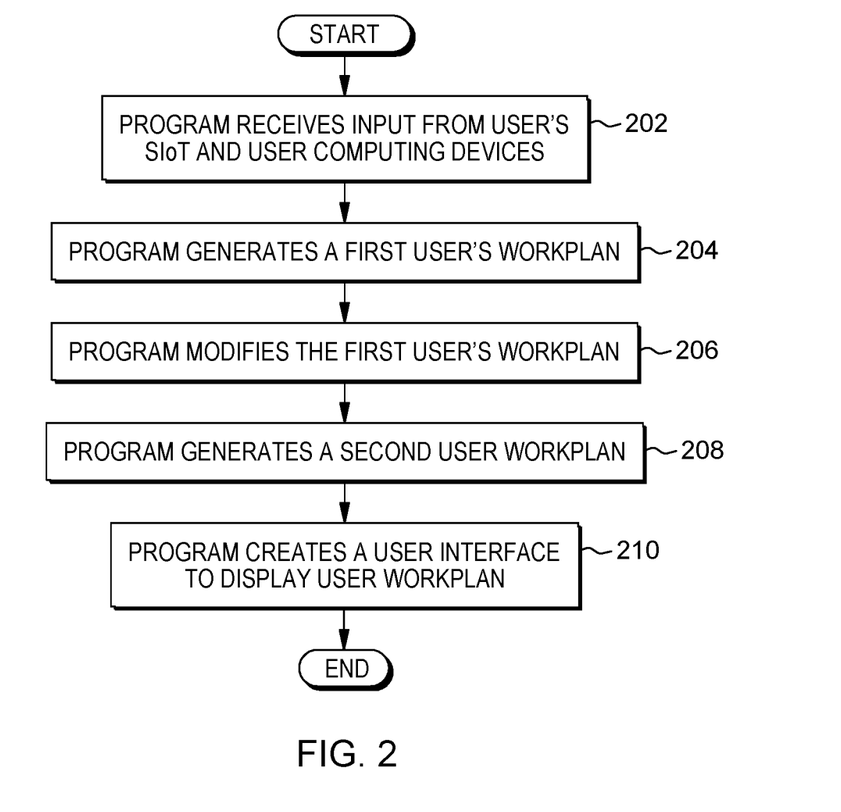
FIG. 2 is a flowchart illustrating operational steps of operating a method on multiple smart home devices, in accordance with an embodiment of the present invention.

FIG. 2 is a flowchart 200 illustrating operational steps for running program 110 to generate, modify, and execute an efficient user workplan, in accordance with an embodiment of the present invention.

In step 202, program 110 receives input collected and received from a user's SIoT and user computing devices 102 via network 106. In this embodiment, program 110 is stored on both user computing devices 102 and server computing device 108. The input received will include the user's daily usage and performance of user computing device 102, user's daily activities, and user's stored events. For program 110 to receive input from user computing devices 102, user computing devices 102 must be registered to communicate to program 110. User computing devices 102 are registered to program 110 by linking a specific device (e.g., home appliance, social network account, or smart phone) in browser 104, which may be a downloadable application, to track the usage, performance, and other input that may be received from user computing devices 102. In another embodiment, program 110 may generate a first user workplan and optimize a schedule based on input received from user computing devices 102. In this embodiment, browser 104 may display the user's workplan in a linear display presentation. In another embodiment, browser 104 may display the user's workplan in a spherical display presentation. For example, after the user registers his appliances, social network accounts, and his smart phone with the downloaded browser 104, program 110 will receive input detailing daily usage and performance of user computing devices 102, any events that user has planned for the day, or any events the user confirmed via the user's SIoT, and this input will be received by program 110 on server computing device 108.

In step 204, program 110 generates a first user's workplan from input received from the user's SIoT and user computing devices 102. In this embodiment, program 110 will use the input received in step 202 to generate a first user's workplan that will detail the input received that includes the user's usage, daily routine, user's SIoT, and any other input that may be received by user computing devices 102. The workplan may be in the form of a list, schedule, or calendar of events, performance and usages. The user's social media accounts will form the base of input received as the user's SIoT. In another embodiment, other users' workplans for their user computing devices 102 may form the base of input for a user's SIoT. In another embodiment, a manufacturer's baseline performance for a specific device may for the user's SIoT. For example, program 110 will receive input detailing the user's daily lightbulb, air conditioning, and television usage based on the user computing devices 102 performance and usage, which will list the usages of the appliances and list of times for user leave to for work, times to for user to return from work, and starting times of television shows normally watched by the user.

In step 206, program 110 modifies the first user's workplan according to additionally received input. In this embodiment, program 110 continues to receive input and in response to receiving that input, modifies the first user's workplan. Program 110 modifies a user's workplan based on a prioritization or preference system that learns the user's habits, routines, and any other information that can be collected from the user's SIoT and user computing devices 102. In this embodiment, the prioritization or preference system may break down each usage or event into different categories, such as habit, medical, and social. Inside each category, different weight is given to different types of events, such that an emergency medical event will be automatically prioritized over a habitual or social event, and a social event that required payment will be automatically prioritized over a habitual or medical event. Program 110 may receive new input in the form of a newly registered appliance or social network account. Program 110 may receive input from user's SIoT detailing a meeting on a specific date, a happy hour invitation, a wedding invitation, a date, a party, a dentist appointment, and any other form of event or social interaction that would force program 110 to automatically modify the first user's workplan. For example, program 110 generated the first user's workplan detailed in step 204, but program 110 also received input detailing a dentist appointment to occur on the same date and at the same time as a wedding that the user was invited to attend and accepted the invitation for from the user's SIoT. Furthermore, program 110 will automatically contact the dentist's office and reschedule the appointment to efficiently modify the user's workplan. In another embodiment, program 110 may allow the user to manually optimize the first user's workplan upon newly received input that could cause a conflict between events and usages. For example, the user may have a dentist appointment conflicting with a scheduled workout; and program 110 may want to automatically reschedule the dentist appointment, but the user may want to reschedule the scheduled workout. The user could manually modify the workplan. In another embodiment, program 110 may compare a user's usage and performance to another user's usage and performance to give a baseline of modification. In another embodiment, program 110 may use a manufacturer's performance baseline as a gauge of performance for user computing devices 102.

At step 208, program 110 generates a second user workplan. In this embodiment, program 110 may generate a second user workplan after receiving new input and modifying the first user workplan to accommodate any automatic changes made to the first user workplan. Program 110 may generate a second user workplan after automatically rescheduling or shifting events to accommodate recently received input that differs from the first user workplan. For example, after new input that conflicts the first user workplan is received, program 110 automatically reschedules events and modifies the first user workplan, which would create the second user workplan. After the second user workplan is generated, program 110 transmits the second user workplan to browser 104 for display on user computing devices 102. In another embodiment, after program 110 generates a second user workplan, a notification is transmitted to user computing devices 102 to alert the user of the change. In another embodiment, program 110 generates a second user workplan that requires the user to manually modify or adjust the first user workplan to resolve any scheduling or timing conflicts.

At step 210, program 110 creates a user interface that displays the second user workplan on user computing devices 102. In this embodiment, the user interface may display the user workplan in a list, schedule, or calendar style display. For example, where user computing devices 102 comprises a smart refrigerator and a smart glass, program 110 can be integrated to display the user interface either in the smart refrigerator and/or the smart glass. In another embodiment, the user interface may display the user workplan in a spherical style display on user computing devices 102.

Figure 3:
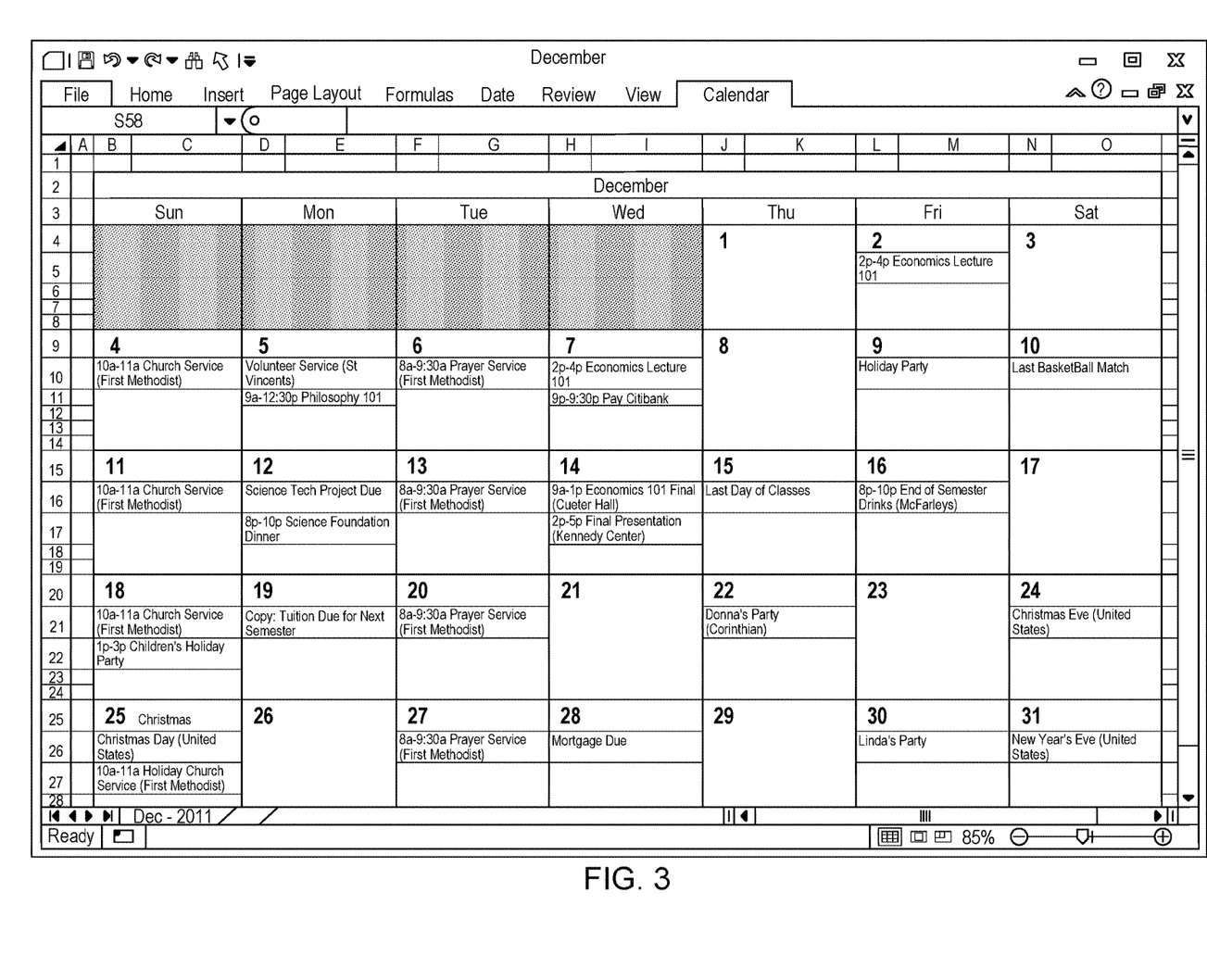
FIG. 3 is an example of browser display detailing the results of the method from the data received from the computing device, in accordance with an embodiment of the present invention.

FIG. 3 is an example of browser 104 display detailing the results of the SIoT method from the input received, in accordance with an embodiment of the present invention. This example shows the display of a user workplan that follows the flowchart illustrated in FIG. 2. In this embodiment, the user workplan is displayed on browser 104 on user computing devices 102, before or after automatic modification from program 110 on server computing device 108. The user workplan may be defined as or include a user interface. In this embodiment, the user workplan is displayed in a list, schedule, or calendar style display on user computing devices 102. For example, where user computing devices 102 comprises a smart refrigerator and a smart glass, program 110 can be integrated to display the user workplan or user interface either in the smart refrigerator and/or the smart glass. In another embodiment, the user workplan or user interface may include an optimize feature, which allows program 110 to automatically reschedule and control user computing devices 102 to make the user workplan more efficient. In another embodiment, the user workplan may be displayed in a spherical display. In another embodiment, the user workplan or user interface may allow for the user to manually adjust, reschedule, or control user computing devices 102 or events as the user desires.

In this embodiment, program 110 may send a notification to user computing devices 102 to alert a modification in the user workplan. The notification may be displayed as a dot, a banner, a text, an e-mail, a phone call, or any combination of the above. In this embodiment, the notification may be displayed as a banner in browser 104 on user computing devices 102. For example, where user computing devices 102 comprises a smart refrigerator and a smart glass, the notification will be a banner displayed along a top border of browser 104 that states the automatic modification that program 110 changed in the user workplan either in the smart refrigerator and/or the smart glass.

Figure 4:
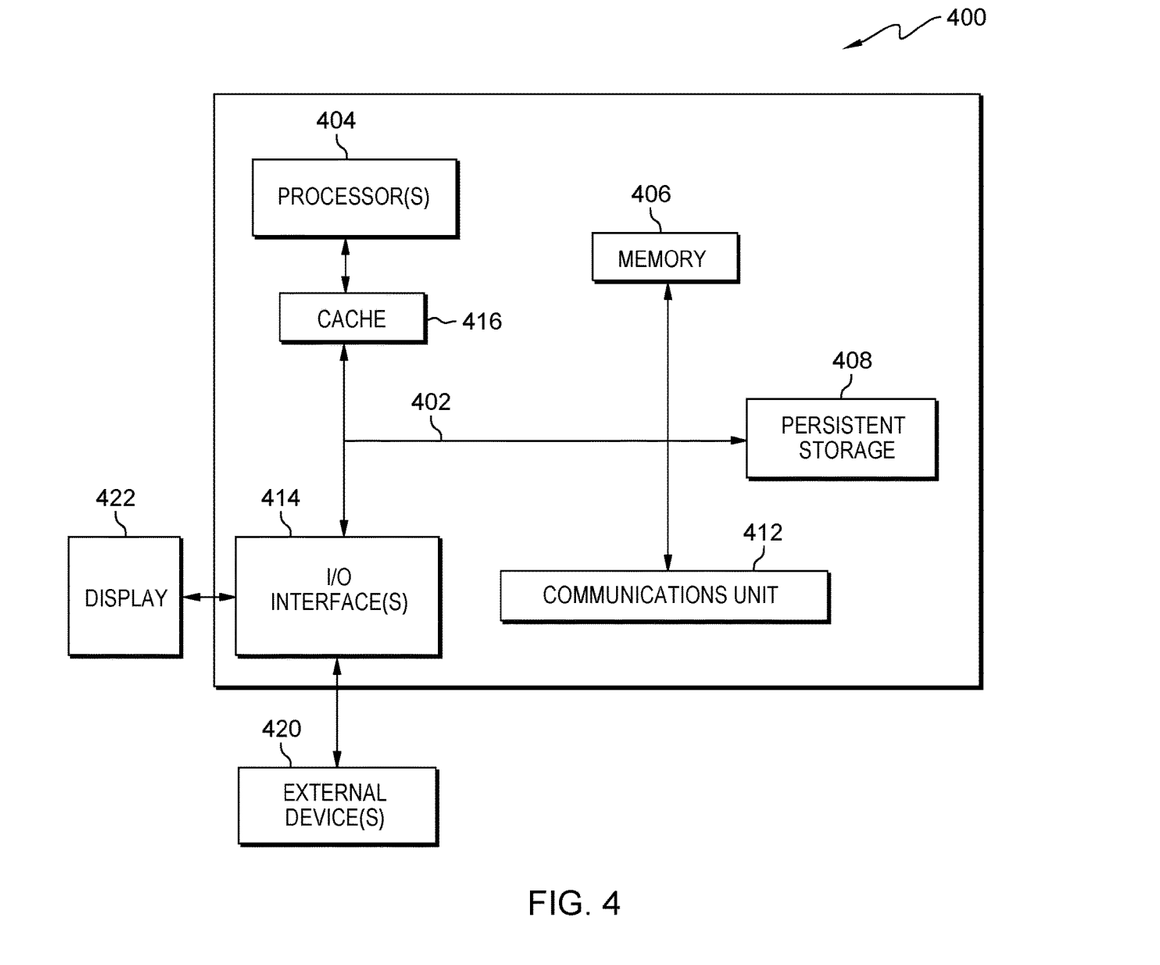
FIG. 4 is a block diagram of internal and external components of the computer systems of FIG. 1, in accordance with an embodiment of the present invention.

FIG. 4 depicts a block diagram of components of computing systems within a haptic display environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes a communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Program 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program 110 may be downloaded to persistent storage 408 through communications unit 410.

I/O interface(s) 412 allows for input and output of data with other devices that may be connected to a mobile device, an approval device, and/or the server computing system 110. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., program 110, can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
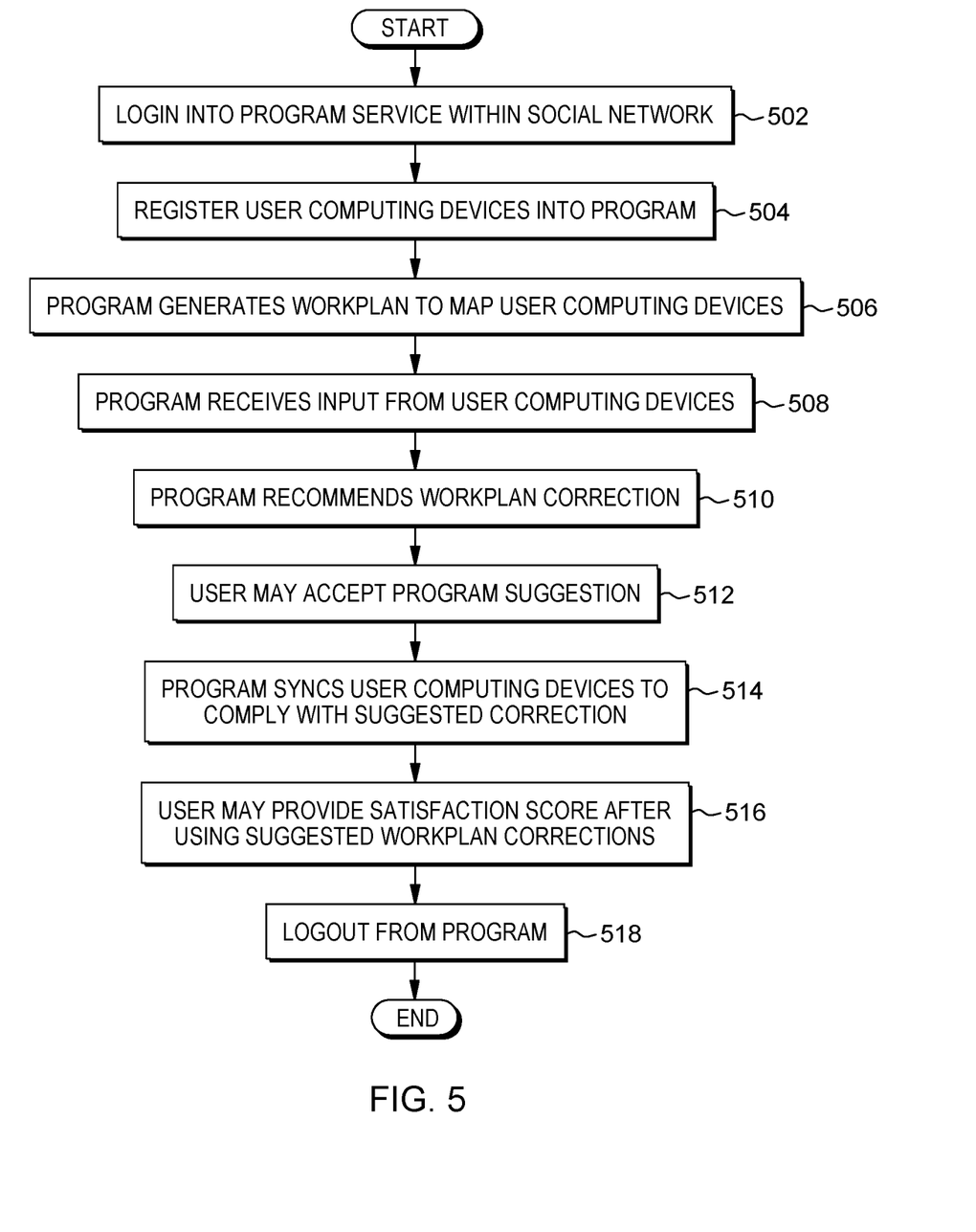
FIG. 5 is a flowchart illustrating operational steps of operating a method on a controlled social IoT network, in accordance with an embodiment of the present invention.

FIG. 5 is a flowchart illustrating operational steps of operating a method on a controlled social IoT network that registers user computing devices into a social network, generates a workplan based on those devices, receives input from those devices, recommends corrections in user's workplan, syncs those computing devices to comply with any recommended corrections, and allows for a user to provide feedback, in accordance with an embodiment of the present invention.

At step 502, a user logs into program 110 within a social network. At step 504, the user registers user computing devices 102 into program 110 in order to track performance, usage, and routine of user. At step 506, program 110 generates a workplan to keep track and map the user's performance, usage, and routine of user computing devices 102. At step 508, program 110 receives additional input from user computing devices 102, which is different, continuing, or newly acquired input in the form of performance, usage, or routine of the user. At step 510, program 110 recommends corrections to the user's workplan based on the input received at step 508. At step 512, program 110 allows the user to accept program 110 suggested corrections to the user workplan through a user interface and based on input received pertaining to the performance, usage, and routine of user computing devices 102, which also allows the user to deny any suggested correction. At step 514, program 110 syncs user computing devices 102 in order to comply with any suggested corrections to the user workplan, which may automate the correction feature of program 110. At step 516, program 110 allows for user feedback by way of a user satisfaction score through a user interface, but only after the user accepts or denies workplan corrections suggested by program 110. At step 518, user logs out of program 110.

In another embodiment, user computing devices 102 may sync suggested configurations stored in program 110 for performance comparison with their baseline workplans, where program 110 derives the best possible configuration from user computing devices 102 of similar types that are part of another user's workplan. In another embodiment, program 110 may present a user interface for user's workplan capable of conversing with program 110 to generate a best user workplan comprising a user's preference, usage, and performance of user computing devices 102 compared to their baseline configurations. In one embodiment, comparing a user workplan to a baseline workplan may comprise comparing similar positions work to determine an efficient method to manage workload, such as an attorney's billable hours efficiency or an examiner's pace to meet a certain quota goal. In another embodiment, comparing a user workplan to a baseline workplan may comprise comparing a user's workplan to a previous workplan of that user.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
generating a first user workplan based on received input acquired from a social Internet of Things (SIoT) of user computing devices, wherein the first user workplan represents user SIoT utilization;
automatically modifying the first user workplan based on a subsequent received input, wherein automatically modifying the first user workplan comprises comparing the first user workplan to a performance baseline workplan for a user computing device, measuring a deviation between the performance baseline workplan and the first user workplan, and reconfiguring the user computing device according to the deviation measured, wherein the performance baseline workplan corresponds to a manufacturer baseline performance for the user computing device;
dynamically prioritizing a plurality of events within the modified user workplan based on a calculated weight associated with each event in the plurality of events within the user computing device; and
in response of prioritizing the plurality of events within the modified user workplan, automatically transmitting the modified user workplan to a user interface on a different computing device associated with the first user.

2. The computer-implemented method of claim 1, wherein generating a first user workplan based on received input comprises receiving input from a user's SIoT.

3. The computer-implemented method of claim 1, wherein generating a first user workplan based on received input comprises receiving input from user computing devices.

4. The computer-implemented method of claim 1, further comprising:
displaying the second user workplan on user computing devices.

5. The computer-implemented method of claim 1, further comprising:
optimizing user computing devices by comparing past user workplans from a common user, measuring a deviation between a past user workplan, and reconfiguring a user computing device according to the deviation, wherein a common user comprises a same type of work, a same type of user computing device, and a same type of user.

6. The computer-implemented method of claim 1, further comprising:
optimizing user computing devices by comparing other user's workplans within a social IoT network, measuring a deviation between another user's workplan, and reconfiguring a user computing device according to the deviation, wherein user computing devices connect to other user computing devices and program analyzes baseline performance of user computing devices.

7. The computer-implemented method of claim 1, further comprising:
displaying the second user workplan in a user interface on a smart glass on a user computing device.

8. The computer-implemented method of claim 1, further comprising:
allowing a user to optimize or manually manipulate a user workplan after generation.

9. A computer program product comprising:
one or more computer readable storage media and program instructions stored on the one or more computer readable storage media, the program instructions comprising:
program instructions to generate a first user workplan based on received input acquired from a social Internet of Things (SIoT) of user computing devices, wherein the first user workplan represents user SIoT utilization;
program instructions to automatically modify the first user workplan based on subsequent received input, wherein automatically modifying the first user workplan comprises comparing the first user workplan to a performance baseline workplan for a user computing device, measuring a deviation between the performance baseline workplan and the first user workplan, and reconfiguring the user computing device according to the deviation measured, wherein the performance baseline workplan corresponds to a manufacturer baseline performance for the user computing device;
program instructions to dynamically prioritize a plurality of events within the modified user workplan based on a calculated weight associated with each event in the plurality of events within the user computing device; and
in response of the program instructions to dynamically prioritize the plurality of events within the modified user workplan, program instructions to automatically transmit the modified user workplan to a user interface on a different computing device associated with the first user.

10. The computer program product of claim 9, wherein program instructions to generate a first user workplan based on received input comprises receiving input from a user's SIoT.

11. The computer program product of claim 9, wherein program instructions to generate a first user workplan based on received input comprises receiving input from user computing devices.

12. The computer program product of claim 9, one or more computer readable storage media and program instructions stored on the one or more computer readable storage media, the program instructions further comprise:
program instructions to display the second user workplan on user computing devices.

13. The computer program product of claim 9, one or more computer readable storage media and program instructions stored on the one or more computer readable storage media, the program instructions further comprise:
program instructions to optimize user computing devices by comparing past user workplans from a common user, measuring a deviation between a past user workplan, and reconfiguring a user computing device according to the deviation, wherein a common user comprises a same type of work, a same type of user computing device, and a same type of user.

14. The computer program product of claim 9, one or more computer readable storage media and program instructions stored on the one or more computer readable storage media, the program instructions further comprise:
program instructions to optimize user computing devices by comparing other user's workplans within a social IoT network, measuring a deviation between another user's workplan, and reconfiguring a user computing device according to the deviation, wherein user computing devices connect to other user computing devices and program analyzes baseline performance of user computing devices.

15. A computer system comprising:
one or more computer processors;
one or more computer readable storage media; and
program instructions stored on the one or more computer readable storage media for execution by at least one of the one or more processors, the program instructions comprising:
program instructions to generate a first user workplan based on received input acquired from a social Internet of Things (SIoT) of user computing devices, wherein the first user workplan represents user SIoT utilization;
program instructions to automatically modify the first user workplan based on subsequent received input, wherein automatically modifying the first user workplan comprises comparing the first user workplan to a performance baseline workplan for a user computing device, measuring a deviation between the performance baseline workplan and the first user workplan, and reconfiguring the user computing device according to the deviation measured, wherein the performance baseline workplan corresponds to a manufacturer baseline performance for the user computing device;
program instructions to dynamically prioritize a plurality of events within the modified user workplan based on a calculated weight associated with each event in the plurality of events within the user computing device; and
in response of the program instructions to dynamically prioritize the plurality of events within the modified user workplan, program instructions to automatically transmit the modified user workplan to a user interface on a different computing device associated with the first user.

16. The computer system of claim 15, wherein program instructions to generate a first user workplan based on received input comprises receiving input from a user's SIoT.

17. The computer system of claim 15, wherein program instructions to generate a first user workplan based on received input comprises receiving input from user computing devices.

18. The computer system of claim 15, one or more computer readable storage media and program instructions stored on the one or more computer readable storage media, the program instructions further comprise:
program instructions to display the second user workplan on user computing devices.

19. The computer system of claim 15, one or more computer readable storage media and program instructions stored on the one or more computer readable storage media, the program instructions further comprise:
program instructions to optimize user computing devices by comparing past user workplans from a common user, measuring a deviation between a past user workplan, and reconfiguring a user computing device according to the deviation, wherein a common user comprises a same type of work, a same type of user computing device, and a same type of user.

20. The computer system of claim 15, one or more computer readable storage media and program instructions stored on the one or more computer readable storage media, the program instructions further comprise:
program instructions to optimize user computing devices by comparing other user's workplans within a social IoT network, measuring a deviation between another user's workplan, and reconfiguring a user computing device according to the deviation, wherein user computing devices connect to other user computing devices and program analyzes baseline performance of user computing devices.

* * * * *